Nov. 8, 1927.  
E. N. TAYLOR  
1,648,010  
ELECTRIC ASSEMBLING MACHINE  
Filed Dec. 19, 1925  
5 Sheets-Sheet 4
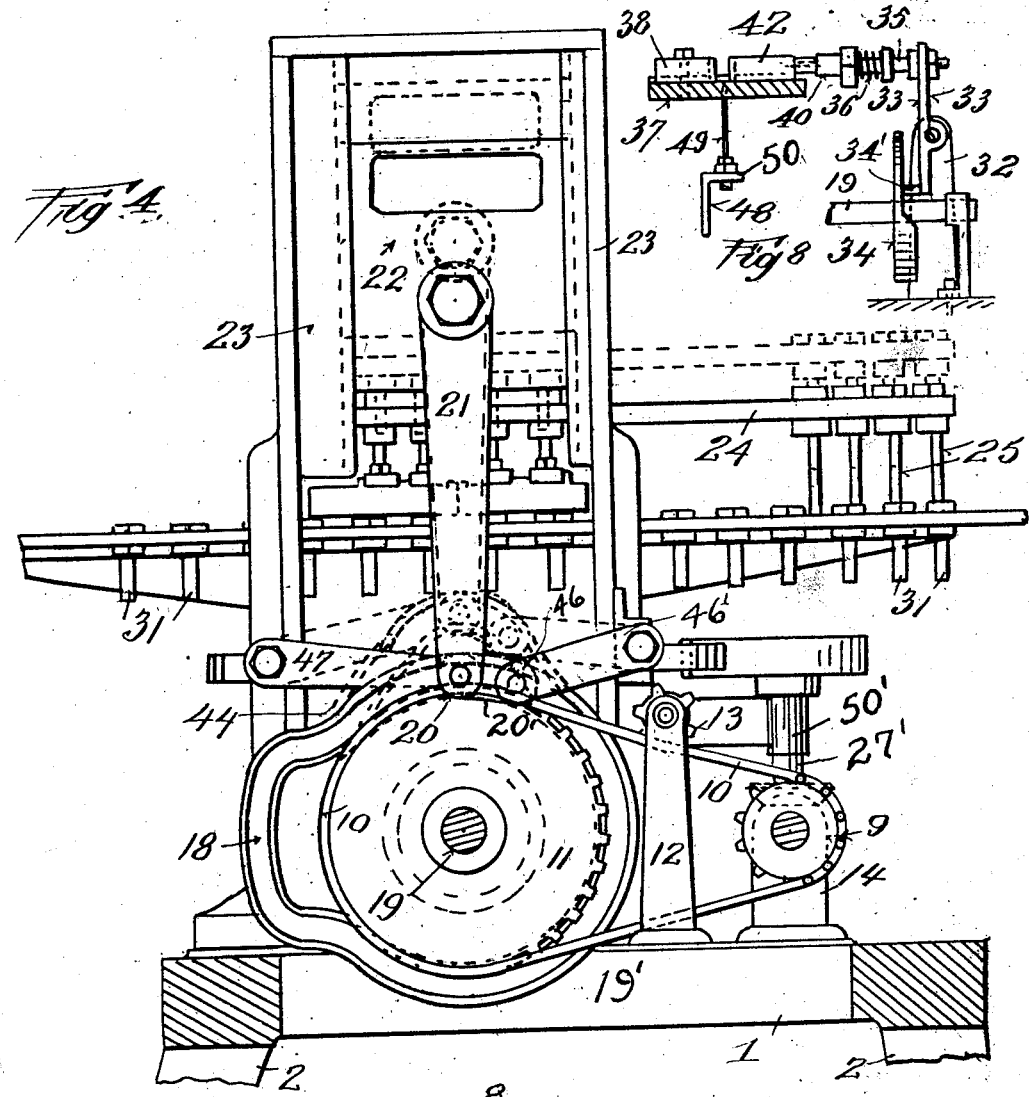
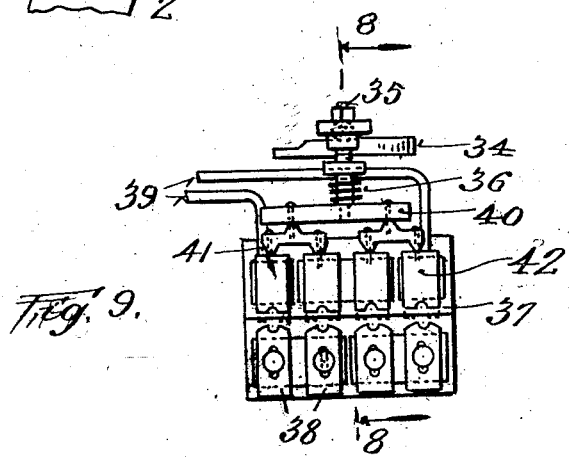

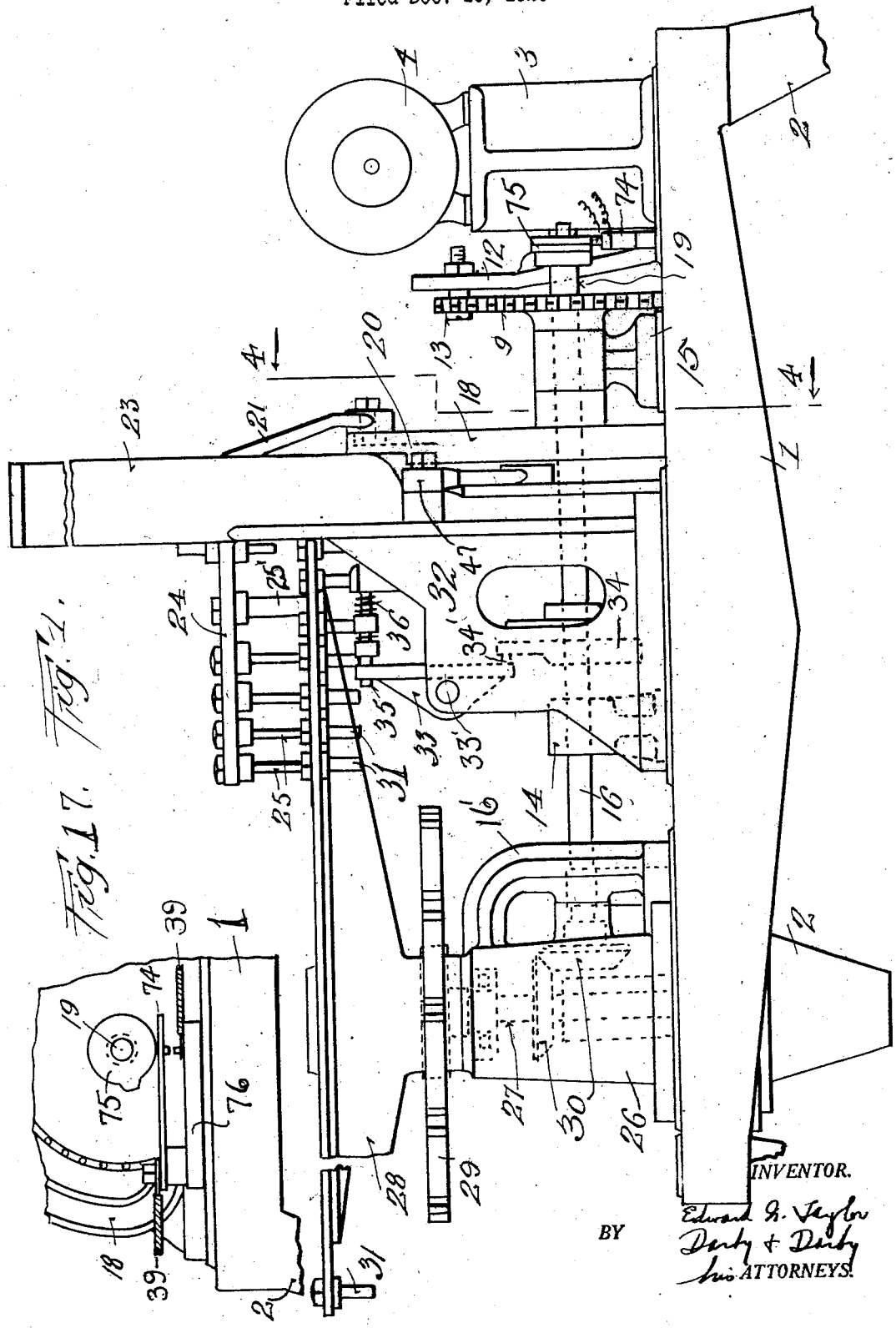

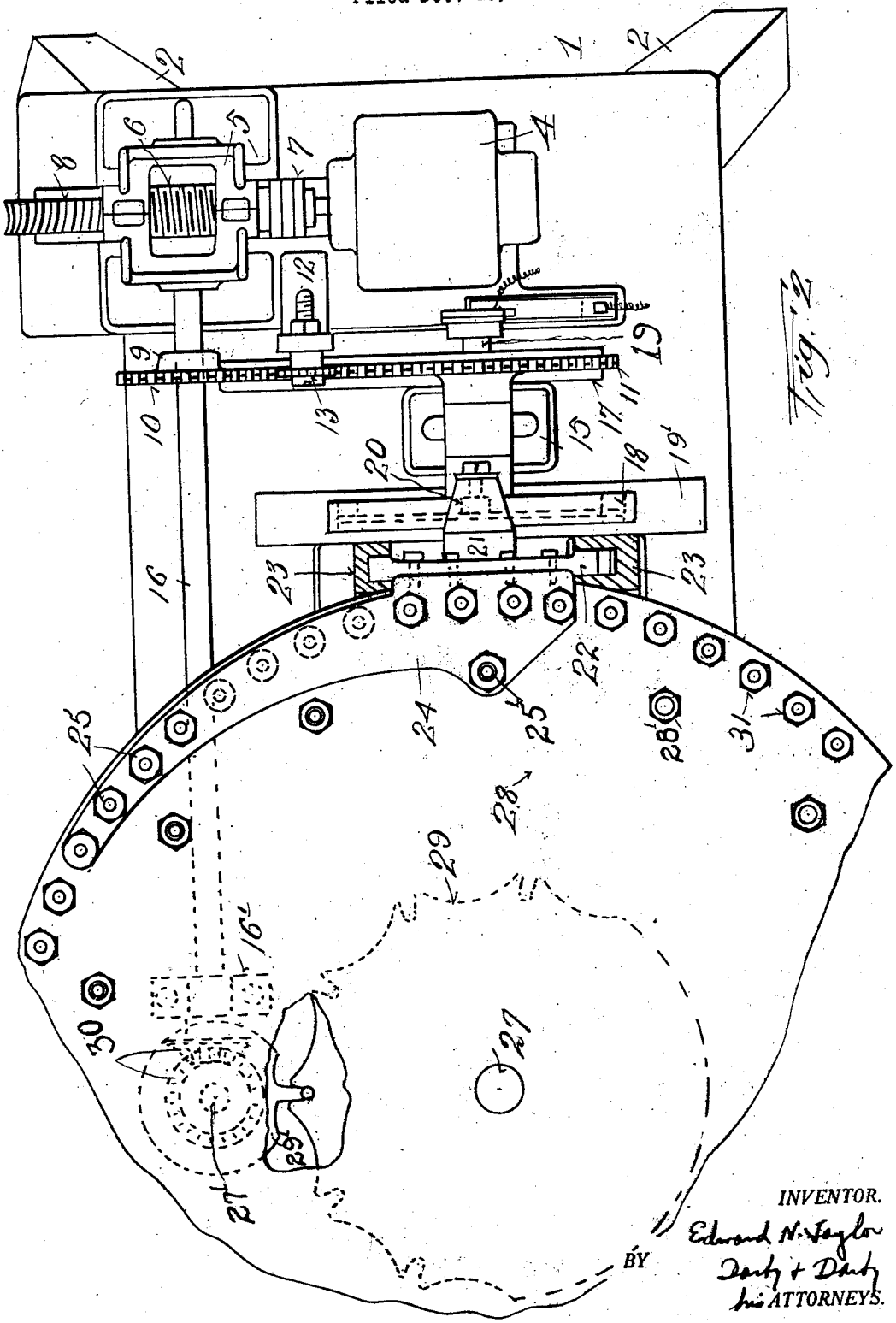

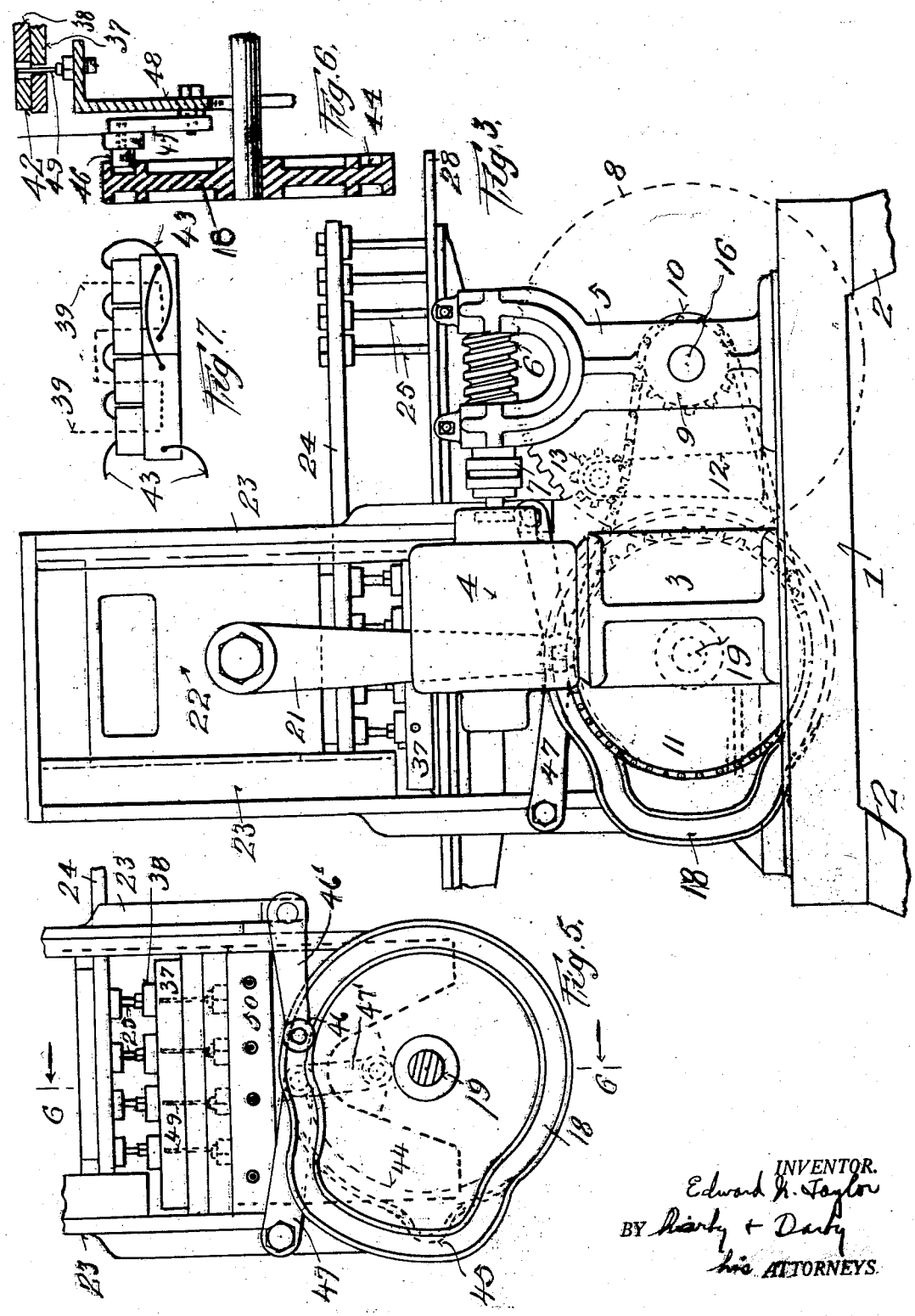

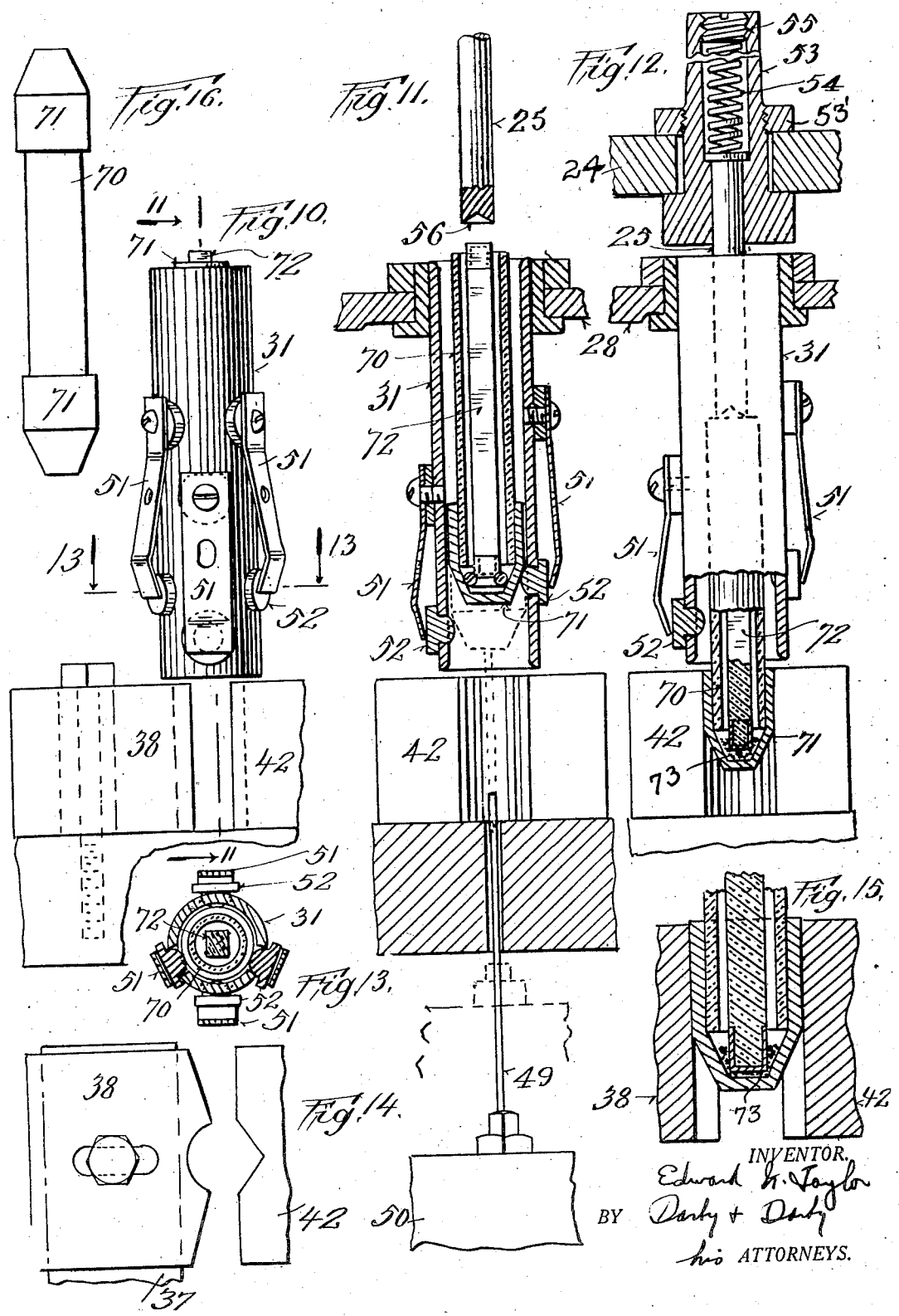

Patented Nov. 8, 1927.

1,648,010

UNITED STATES PATENT OFFICE.

EDWARD N. TAYLOR, OF UPPER MONTCLAIR, NEW JERSEY, ASSIGNOR TO DE FOREST RADIO COMPANY, OF JERSEY CITY, NEW JERSEY, A CORPORATION OF DELAWARE.

ELECTRIC ASSEMBLING MACHINE.

Application filed December 19, 1925. Serial No. 76,466.

My invention relates broadly to an assembling machine. More particularly, this invention is directed to a grid leak assembling machine by means of which it is possible to construct grid leaks of the cartridge type for use in radio circuits.

One of the objects of this invention is the construction of a machine by the use of which it is possible to rapidly and economically assemble the component parts of grid leaks with minimum breakage and wastage of parts.

A further object of the invention is the provision of a machine of a semi-automatic nature the use of which makes it possible for one operator to turn out large quantities of the finished product.

My invention resides substantially in the construction, combination and relative arrangement of parts, as will be more fully pointed out hereinafter.

Referring to the drawings, in which the same reference numeral will be used throughout the several views to indicate the same part, Fig. 1 is a side elevational view of the machine of my invention.

Fig. 2 is a top plan view of my machine with some of the parts broken away.

Fig. 3 is an end elevational view of my invention.

Fig. 4 is a vertical sectional view with some of the parts broken away, taken on the line 4—4 of Fig. 1, looking in the direction of the arrows.

Fig. 5 is a sectional elevational view showing the gate operating cam.

Fig. 6 is a vertical sectional view of a detail of my invention taken on the line 6—6 of Fig. 5, looking in the direction of the arrows.

Fig. 7 is a more or less diagrammatic view of the welding blocks and their supports, showing the method of cooling the blocks.

Fig. 8, is a vertical sectional view of the welding blocks and their supports, taken on the line 8—8 of Fig. 9, looking in the direction of the arrows.

Fig. 9 is a top plan view of the welding blocks and their supports, showing the method of cooling them, as well as a device for sliding one set of blocks towards the other set.

Fig. 10 is a side elevational view of one of the spring fingers used for holding the parts to be assembled.

Fig. 11 is a vertical sectional view of the spring finger taken on the line 11—11 in Fig. 10, looking in the direction of the arrows. This view also shows the means for raising the assembled parts from between the welding blocks after the heating period.

Fig. 12 is a vertical elevational view, partly in section, showing the welding blocks with one of the grid leaks forced down in the position to be welded and the means for forcing it downward.

Fig. 13 is a sectional view of the spring finger taken on the line 13—13 of Fig. 10 looking in the direction of the arrows.

Fig. 14 is a plan view partly in section of the welding blocks showing the method of mounting them on their supports.

Fig. 15 is an enlarged cross-sectional view in detail of a grid leak forced between the welding blocks.

Fig. 16 is an elevational view of a completed grid leak.

Fig. 17 is an enlarged detail view of the cam operated switch for closing the electrical heating circuit to the welding blocks.

In the manufacture of large quantities of small pieces of equipment such as grid leaks for use in radio circuits it is desirable to secure some means of rapidly and conveniently assembling the component parts of the grid leaks and holding them in their assembled position while they are soldered together into a unitary structure. It is therefore one of the particular objects of my invention to produce a machine or device which will be adapted for the production of large quantities of completed grid leaks. Although I describe the construction and operation of this machine in connection with grid leaks, I do not, of course, desire to be limited specifically to this use. It is evident that I have produced a machine which is capable of welding together the parts of many types of small objects. The principles of operation of the machine of my invention are capable of embodiment in many types of assembling machines, and therefore I do not wish to be understood as applying these principles to grid leak assembling machines exclusively.

Referring now to Fig. 1, I have illustrated one form of my invention in which the device is shown as a machine having a bed plate 1 supported by legs 2. Mounted at one end of the bed plate 1 is a vertical support 3 having secured thereto a motor 4. It is, of course, evident that other sources of power may be used for operating my machine; but the most desirable form is that of the electrical drive which I have illustrated in my drawings. Mounted on the bed plate at the same end of the machine as support 3 (see Figs. 2 and 3) is a vertical support 5, being Y-shaped at its upper end. Journaled in the upper end of the support 5 is a worm 6 mounted on a shaft which is secured by means of coupling 7 to the driving means 4. This worm 6 meshes with a worm wheel 8 which is rigidly secured to a horizontal shaft 16 journaled at one end in the upright 5 and at the other in a bearing block 16'. Rigidly secured to the horizontal shaft 16 is a toothed wheel 9 which drives by means of link belt 10 a larger toothed wheel 11, which in turn is mounted on a horizontal shaft 19. To provide means for taking up any slack in the link belt 10, the small toothed wheel 13 is mounted on the support 12 secured to the bed plate in such a manner that the toothed wheel may be moved with respect to the chain in order to adjust its tension.

A bearing member 15 is secured to the bed plate and forms a journal for the shaft 19. Mounted on the shaft is a large cam 18 on which rides a cam follower rigidly secured to an arm 21 pivotally attached to a vertically slidable gate member 22 which is free to move in grooves in a framework 23, 23, secured to the bed plate. On the opposite side of the gate member 22 is a horizontal arm 24 adapted to move vertically with the gate member, and having secured to it at its outer free end a number of depending fingers 25, for a purpose which will be explained later. The arm 24 also has depending from it a centering pin 25', the use of which will be described hereinafter.

At the end of the bed plate opposite to that which supports the power source is a large vertical post 26 upon which is mounted a horizontal revolvable table 28 by means of a shaft 27 which extends into the post 26. Also mounted on the shaft 27 and rigidly secured to the table member 28 is a large gear 29 forming a part of the means for intermittently rotating the table 28. This gear 29 and its driving member 29' form the well known Geneva gear movement. The driving member 29' is also mounted on a vertical shaft 27' which is caused to rotate by a number of bevel gears 30, one of which is secured to horizontal shaft 16. Depending from the horizontal table 28, near the periphery thereof are a number of spring fingers 31 shown diagrammatically in Figs. 1 and 4, and in detail in Figs. 10 to 13.

Extending from the side of the vertical framework 23, nearest the revolvable table 28, are two vertical parallel plates 32 which form a bearing member having a short horizontal shaft 33' upon which is rigidly mounted a short lever arm 33. Between the two parallel plates 32 and mounted on shaft 19 is a cam member 34 upon which rides the cam follower 34ᴬ which is secured to the lower end of the lever 33. At the upper end of the lever 33 is securely attached a short arm 35 which has at its free end yoke member 40, and two smaller yoke members 41 which press against the movable parts of the welding blocks 42. As the cam follower 34' rides up on the hump on cam 34, the yoke member 40 is forced forward against the action of spring 36 to cause the movable halves of the welding blocks 42 to rigidly clamp the parts to be welded between them, and the halves of the welding blocks. This action will be explained more fully hereinafter. The movable halves 42 of the welding blocks and the halves 38 are mounted upon an insulating support 37.

In Fig. 9, the cables 39 represent the terminals of the electrical circuit through the welding blocks.

In Fig. 7, the dotted line 39 indicates the path of the electrical current through the welding blocks. In this figure is also shown the path of the cooling water by means of which I intend to cool the welding blocks after each heating operation. This path is indicated by the lines 43 which are diagrammatic representations of water pipes.

Rigidly mounted on shaft 19 directly in back of the cam 18 is another cam 44 having on its cam surface a hump 45.

Pivotally attached to one side of the frame 23 is a short lever arm 47 having attached to it a cam follower which rides in the grooves of cam 44. Attached to the cam follower end of this short lever arm 47 is a link member 47' secured to a gate 50 vertically slidable in the framework 23, and having mounted on its upper edge the fingers 49. This gate member 50 is mounted under the welding blocks and its action will be described later. On the other side of the framework 23 is provided a short lever arm 46' which has at its outer free end a short link member connecting it with the arm 21 which has a cam follower riding in the grooves of cam 18. The purpose of the two arms 46' and 47 is to absorb any side thrust which may be produced as the gates 22 and 50 are forced upwardly and downwardly, due to the action of the cam grooves on their respective followers. By mounting the arms 21 and 47' pivotally to their respective gate members and providing the thrust absorbing arms 46' and 47, it is possible to eliminate the possibility of the gates jamming in their guideways as they move backward and forward.

Referring now to Figs. 10 to 15, there is shown more clearly the construction of the spring fingers 31 as well as the functions of the fingers 25 and 49.

Mounted on the hollow cylindrical body of the spring fingers 31 are a plurality of spring clips 51 which force small buttons 52 through holes in the walls of the hollow body to form obstructions within the hollow wall.

In Fig. 12 is shown the method of resiliently mounting the depending rods 25. Attached to the arm 24 is a small thimble member 53 which is clamped thereon by means of a nut 53'. Within the thimble 53 is a hollow chamber having a small threaded plug 55 in its upper end, which forms a closed chamber to house the coil spring 54. This spring 54 presses the finger 25 downwardly so that as the arm 24 descends provision is made for a relative upward movement of finger 25 in case it should meet with any obstruction.

The lower end of the finger 25 is made cup-shaped, as at 56 in Fig. 11, to aid in centering the resistance element 72 of the grid leak which is being assembled.

A complete grid leak is composed of the glass enclosed cylinder 70 over the ends of which fit the metal caps 71, 71. Within the glass cylinder and caps is a resistance element 72, which has its ends copper-plated, and which is soldered at these ends to the caps 71, 71 by means of solder (73), see Fig. 15.

In Fig. 17 is disclosed the cam operated switch for closing the electrical circuit to the welding blocks. Mounted on the shaft 19 is a small cam 75 which as it rotates forces downwardly the spring arm 74 which closes the electrical circuit between the two cable ends 39, 39. This switch is secured on an insulating base 76 to the bed plate of the machine.

*Operation of the machine.*

After the power source is set in operation and the current is turned on to the welding blocks, the operator stands at one edge of the intermittently revolvable table and deposits within the spring fingers 31, first, a cap 71; then a small amount of solder is dropped into the cap and a glass casing 70 and a resistance element 72 are dropped down into the cap.

As shown in the specific embodiment of this machine, it is intended that four grid leaks be soldered at one time. Therefore the machine is so constructed that at the end of each movement of the table 28, four unassembled grid leaks are presented to the welding blocks. As soon as the table becomes stationary, the gate 22 descends and forces the unassembled grid leak down between the welding blocks 38 and 42 by means of the spring pressed fingers 25, as shown in Fig. 12. The cam switch then closes, and the electrical current passes through the welding blocks and the ends of the caps between them generating sufficient heat to cause the solder to flow and weld the parts together. As is well known, a low voltage, high current source of power is desirable with this operation.

The current is on for a very short period after which the cam switch opens and the blocks are rapidly cooled by the cooling water flowing through them.

The next step in the operation of the machine is to force the partly completed grid leak up from between the welding blocks. This is accomplished by the upward movement of the lower gate 50 and its fingers 49 which extend through the welding blocks supports and upwardly between them, as is clearly shown in Fig. 11. The small spring pressed button on the spring finger 31 retains the grid leak in this upward position. The horizontal table 28 then moves onward until four unwelded grid leaks are presented to the welding blocks.

As the spring fingers 31 containing the welded grid leaks move under the finger 25 on the outer end of the arm 24, they are forced out of the spring fingers 31 as the arm 24 descends into a suitable receptacle. It is, of course, evident that they must go through a similar operation to weld the other cap on to the other end.

In order to make it easy for the cap 71 to slip between the welding block halves 38 and 42, one set 42 is moved away from the set 38 by means of the cam 34. After the caps to be welded are down in place between the blocks the cam forces the movable member 42 towards the stationary members so as to tightly clamp the caps so that the current may readily flow through them.

The centering pin 25' mounted on the arm 24 descends into the openings 28' on the table 28 slightly ahead of the finger 25. This pin 25' is tapered at its free end so as to serve as a centering means so that the fingers 25 will meet no obstructions as they descend to force the grid leaks between the welding blocks.

It will thus be seen by the foregoing description that I have provided a new and novel machine for readily assembling together the individual parts of small products and more particularly grid leaks. I do not, of course, desire to be strictly limited to the embodiment of my invention which I have shown for purposes of illustration; but desire rather to be limited only by the spirit and scope of my invention, as I have defined it in the appended claims.

Having now set forth the objects and nature of my invention, and having shown and described a specific embodiment thereof, what I claim as new and useful and desire to secure by Letters Patent, is:

1. In an assembling machine of the type described, the combination of a rotatable table having spring fingers thereon for holding the parts to be assembled, electrical means for clamping and heating the parts, and means for revolving said table to bring said fingers into alignment with said heating means and to operate said means to perform its clamping function.

2. In an assembling machine of the type described, the combination of a rotatable table having fingers thereon for holding the parts to be assembled, clamping means for heating the parts, and electrical means for revolving said table to bring said fingers into alignment with said heating means and to operate said means to perform its clamping function.

3. In an assembling machine of the type described, the combination of a rotatable table having fingers thereon for holding the parts to be assembled, electrical means for clamping and heating the parts, and means for intermittently revolving said table to bring said fingers into alignment with said heating means and to operate said means to perform its clamping function.

4. In an assembling machine, a revolvable table, a plurality of means on said table for holding the parts to be assembled, means for heating the parts, means for forcing the parts into operative relation with said heating means, means for forcing the parts out of operative relation with said heating means after the heating means have cooled, and means for releasing said parts after the table is moved away from said heating means.

5. In an assembling machine, a revolvable table, a plurality of means on said table for holding the parts to be assembled, electrical means for heating the parts, means for forcing the parts into operative relation with said heating means, means for forcing the parts out of operative relation with said heating means after the heating means have cooled, and means for releasing said parts after the table is moved away from said heating means.

6. In an assembling machine, a revolvable table, means for intermittently moving said table, means on said table for holding the parts to be assembled, means for heating the parts, means for pressing the parts into contact with said heating means, and means for forcing the parts after heating out of contact with said heating means, and means for removing the parts from said holding means.

7. In an assembling machine, a revolvable table, means for intermittently moving said table, means on said table for holding the parts to be assembled, electrical means for heating the parts, means for pressing the parts into contact with said heating means, and means for forcing the parts after heating out of contact with said heating means, and means for removing the parts from said holding means.

8. In an assembling machine, means for holding the parts to be assembled, cam means for intermittently causing said holding means to rotate, means for heating the parts, cam operated means for pressing the parts into contact with said heating means, cam operated means for forcing the parts out of contact with said heating means after the heating operation, and cam operated means for releasing the assembled parts from said holding means.

9. In an assembling machine, means for holding the parts to be assembled, cam means for intermittently causing said holding means to rotate, means for heating the parts, comprising a plurality of opposed conducting blocks forming jaws to receive the parts to be heated, cam operated means for pressing the parts into contact with said heating means, cam operated means for forcing the parts out of contact with said heating means after the heating operation, and cam operated means for releasing the assembled parts from said holding means.

10. In an assembling machine, a revolvable table having depending from the marginal edge thereof a plurality of spring fingers to receive the parts to be assembled, means for moving the table, means for heating the parts, and cam operated means for energizing said heating means, said cam means being connected to said table moving means.

11. In an assembling machine, a revolvable table having depending from the marginal edge thereof a plurality of spring fingers to receive the parts to be assembled, means for moving the table, electrical means for heating the parts, and a cam operated switch for energizing said heating means, said table moving means operating said cam.

12. In an assembling machine, a revolvable table, having depending from the marginal edge thereof a plurality of spring fingers to receive the parts to be assembled, means for moving the table comprising a Geneva movement, means for heating the parts, and cam operated means for energizing said heating means, said table moving means being arranged to control said cam.

In testimony whereof I have hereunto set my hand on this 10th day of December, A. D. 1925.

EDWARD N. TAYLOR.